United States Patent
Jang et al.

(10) Patent No.: US 12,224,660 B2
(45) Date of Patent: Feb. 11, 2025

(54) ELECTRONIC APPARATUS AND CONTROL METHOD THEREOF

(71) Applicant: SAMSUNG ELECTRONICS CO., LTD., Suwon-si (KR)

(72) Inventors: Duhee Jang, Suwon-si (KR); Wonmyung Woo, Suwon-si (KR); Jeongil Kang, Suwon-si (KR); Sanghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 18/094,769

(22) Filed: Jan. 9, 2023

(65) Prior Publication Data

US 2023/0163680 A1    May 25, 2023

Related U.S. Application Data

(63) Continuation of application No. PCT/KR2022/012913, filed on Aug. 30, 2022.

(30) Foreign Application Priority Data

Aug. 31, 2021 (KR) .................... 10-2021-0115928

(51) Int. Cl.
*H02M 1/42*    (2007.01)
*G05F 1/70*    (2006.01)
*H02M 7/06*    (2006.01)

(52) U.S. Cl.
CPC .......... *H02M 1/4266* (2013.01); *H02M 7/06* (2013.01); *G05F 1/70* (2013.01); *H02M 1/4208* (2013.01); *H02M 1/4225* (2013.01)

(58) Field of Classification Search
CPC ...... G05F 1/70; H02M 1/4208; H02M 1/4225
See application file for complete search history.

(56) References Cited

U.S. PATENT DOCUMENTS 8,094,473 B2    1/2012    Moon et al.
8,199,541 B2    6/2012    Yang
(Continued)

FOREIGN PATENT DOCUMENTS

CN    101931319 A    12/2010
CN    105790614 B    1/2019
(Continued)

OTHER PUBLICATIONS

International Search Report (PCT/ISA/210) dated on Dec. 22, 2022 issued by the ISA for International Application No. PCT/KR2022/012913.
(Continued)

Primary Examiner — Gary A Nash
(74) Attorney, Agent, or Firm — Sughrue Mion, PLLC

(57) ABSTRACT

The electronic apparatus including a power factor correction (PFC) circuit and a control circuit configured to control an operation of the PFC circuit is provided. The PFC circuit includes a first inductor part connected to one end of an AC voltage part and a first switch connected to a first inductor in series; a second inductor part connected to another end of the AC voltage part and a second switch connected to a second inductor in series; an output part connected to the first inductor part and the second inductor part; and a switching part, and the control circuit identically applies a switch on/off signal to the first switch and the second switch, and selectively applies a switch on/off signal to the third switch or the fourth switch based on a magnitude of an input voltage input through the AC voltage part.

19 Claims, 13 Drawing Sheets

(56) References Cited

U.S. PATENT DOCUMENTS

| | | |
|---|---|---|
| 9,590,495 B2 | 3/2017 | Fu et al. |
| 10,389,232 B2 | 8/2019 | Ikarashi |
| 11,695,329 B2 | 7/2023 | Pevere |
| 2006/0013024 A1 | 1/2006 | Temesi et al. |
| 2009/0230929 A1* | 9/2009 | Sui ................... H02M 1/4208 323/207 |
| 2009/0256543 A1* | 10/2009 | Yang ................. H02M 1/4208 323/284 |
| 2010/0277837 A1 | 11/2010 | Myhre et al. |
| 2015/0002108 A1* | 1/2015 | Kim ................... H02M 1/4225 323/210 |
| 2015/0162822 A1* | 6/2015 | Ho .................... H02M 1/4225 363/89 |

FOREIGN PATENT DOCUMENTS

| | | |
|---|---|---|
| EP | 2 882 083 A1 | 6/2015 |
| JP | 2011-91927 A | 5/2011 |
| JP | 2016-171617 A | 9/2016 |
| JP | 2019-58043 A | 4/2019 |
| JP | 2019-126217 A | 7/2019 |
| KR | 10-1406476 B1 | 6/2014 |
| KR | 10-2015-0044333 A | 4/2015 |

OTHER PUBLICATIONS

Written Opinion (PCT/ISA/237) dated on Dec. 22, 2022 issued by the ISA for International Application No. PCT/KR2022/012913.
Extended European Search Report issued on Sep. 26, 2024 by the European Patent Office for European Patent Application No. 22864993.5.

* cited by examiner $V_{IN} > 0$, $M_1$, $M_2$ OFF, $M_4$ ON $V_{IN} > 0$, $M_1$, $M_2$ ON, $M_4$ ON Vin > 0

Vin < 0

ELECTRONIC APPARATUS AND CONTROL METHOD THEREOF

CROSS-REFERENCE TO RELATED APPLICATION(S)

This application is a bypass continuation of International Application No. PCT/KR2022/012913, filed on Aug. 30, 2022, which is based on and claims priority to Korean Patent Application No. 10-2021-0115928, filed on Aug. 31, 2021, in the Korean Intellectual Property Office, the disclosures of which are incorporated by reference herein in their entireties.

BACKGROUND

1. Field

Apparatuses and methods consistent with the disclosure relate to an electronic apparatus and a control method thereof, and more particularly, to an electronic apparatus including a plurality of switching elements and a control method thereof.

2. Description of Related Art

If a power supply does not have a power factor correction function, there is a problem that a phase difference between voltage and current occurs, which increases reactive power and wastes unnecessary power in a power transmission stage. In this regard, many countries enforce regulations that a power supply in an electronic device needs to have a power factor correction function.

Accordingly, various structures have been proposed to implement the power factor correction function in the power supply.

However, in order to implement the power factor correction function, many parts such as coils are used, resulting in problems that a volume of the power supply is increased, excess heat is generated, and a material cost increases.

In particular, a conventional power supply includes a power factor correction (PFC) circuit, and the PFC circuit has been implemented as a diode bridge PFC circuit, a bridge synchronous rectifier, a bridgeless PFC circuit, or the like.

Various types of conventional PFC circuits have respective disadvantages. For example, the diode bridge PFC circuit has a problem that parts are heated and a large power loss occurs in the diode bridge, the bridge synchronous rectifier has a problem that the number of switching elements (field effect transistors (FETs)) in the circuit increases significantly, and the bridgeless PFC circuit has a problem that it requires a high-price digital signal processor (DSP) to generate a signal for controlling the circuit even though it does not include a diode bridge. There has been a need for a PFC circuit that corrects the foregoing disadvantages.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides an electronic apparatus capable of stably providing an output voltage while minimizing power loss and heat generation of parts, and a control method thereof.

Embodiments of the disclosure overcome the above disadvantages and other disadvantages not described above. Also, the disclosure is not required to overcome the disadvantages described above, and an embodiment of the disclosure may not overcome any of the problems described above. Additional aspects of the disclosure will be set forth in part in the description which follows and additional aspects will be apparent from the description, or may be learned by practice of the disclosure.

According to an embodiment of the disclosure, an electronic apparatus includes: a power factor correction (PFC) circuit; and a control circuit configured to control an operation of the PFC circuit. The PFC circuit may include: a first inductor part including a first inductor connected to one end of an AC voltage part and a first switch connected to the first inductor in series; a second inductor part including a second inductor connected to the other end of the AC voltage part and a second switch connected to the second inductor in series; an output part including an output capacitor and a sensing resistor connected to each of the first inductor part and the second inductor part, the output capacitor and the sensing resistor connected to each other in series; and a switching part including a third switch connected to the one end of the AC voltage part and a fourth switch connected to the other end of the AC voltage part. The control circuit identically applies a switch on/off signal to each of the first switch and the second switch, and selectively applies a switch on/off signal to either the third switch or the fourth switch based on a magnitude of an input voltage input through the AC voltage part.

The first inductor part may further include a first diode having one end connected to the first inductor and the other end connected to one end of the output capacitor. One end of the first inductor may be connected to the one end of the AC voltage part, and the other end of the first inductor may be connected to each of one end of the first switch and the one end of the first diode. The one end of the first switch may be connected to the other end of the first inductor, and the other end of the first switch may be connected between the other end of the output capacitor and one end of the sensing resistor. The second inductor part may further include a second diode having one end connected to the second inductor and the other end connected to the one end of the output capacitor. One end of the second inductor may be connected to the other end of the AC voltage part, and the other end of the second inductor may be connected to each of one end of the second switch and the one end of the second diode. The one end of the second switch may be connected to the other end of the second inductor, and the other end of the second switch may be connected between the other end of the output capacitor and the one end of the sensing resistor.

One end of the third switch may be connected to the one end of the AC voltage part, and the other end of the third switch may be connected to the other end of the sensing resistor. One end of the fourth switch may be connected to the other end of the AC voltage part, and the other end of the fourth switch may be connected to the other end of the sensing resistor.

The one end of the AC voltage part may be a positive (+) terminal and the other end of the AC voltage part may be a negative (−) terminal. When the input voltage is a positive (+) voltage, the control circuit may turn off the third switch and turn on the fourth switch to apply the input voltage to the first inductor. When the input voltage is a negative (−) voltage, the control circuit may turn on the third switch and turn off the fourth switch to apply the input voltage to the second inductor.

The control circuit may turn on the first switch while turning on the fourth switch to control the PFC circuit such that a current passing through the first inductor passes through the first switch, the sensing resistor, and the fourth switch. The control circuit may turn off the first switch while turning on the fourth switch to control the PFC circuit such that a current passing through the first inductor passes through the first diode, the output capacitor, the sensing resistor, and the fourth switch.

The control circuit may turn on the second switch while turning on the third switch to control the PFC circuit such that a current passing through the second inductor passes through the second switch, the sensing resistor, and the third switch. The control circuit may turn off the second switch while turning on the third switch to control the PFC circuit such that a current passing through the second inductor passes through the second diode, the output capacitor, the sensing resistor, and the third switch.

When the input voltage is a positive (+) voltage, the control circuit may turn off the third switch and turn on the fourth switch to apply the input voltage to the first inductor. When the input voltage is a negative (−) voltage, the control circuit may turn on the third switch and turn off the fourth switch to apply the input voltage to the second inductor. While the input voltage is applied to the first inductor, a sum of a voltage applied to the sensing resistor and a voltage applied to the fourth switch may be smaller than a voltage applied to the second switch. While the input voltage is applied to the second inductor, a sum of a voltage applied to the sensing resistor and a voltage applied to the third switch may be smaller than a voltage applied to the first switch.

The sensing resistor may be implemented as a transformer element configured to transform an AC voltage. While the input voltage is applied to the first inductor, the control circuit may control the transformer element such that a sum of a voltage transformed by the transformer element and a voltage applied to the fourth switch is smaller than a voltage applied to the second switch. While the input voltage is applied to the second inductor, the control circuit may control the transformer element such that a sum of a voltage transformed by the transformer element and a voltage applied to the third switch is smaller than a voltage applied to the first switch.

The first switch and the second switch may have a relatively larger forward voltage drop than the third switch and the fourth switch, or the third switch and the fourth switch may have a relatively smaller turn-on resistance value than the first switch and the second switch.

The PFC circuit may further include a diode bridge, and the control circuit may charge the output capacitor through the diode bridge in an initial transient state.

According to an embodiment of the disclosure, a control method of an electronic apparatus including a power factor correction (PFC) circuit and a control circuit configured to control an operation of the PFC circuit may include: identically applying a switch on/off signal to each of a first switch and a second switch; and selectively applying a switch on/off signal to either a third switch or a fourth switch based on a magnitude of an input voltage input through an AC voltage part. The PFC circuit may include: a first inductor part including a first inductor connected to one end of the AC voltage part and the first switch connected to the first inductor in series; a second inductor part including a second inductor connected to the other end of the AC voltage part and the second switch connected to the second inductor in series; an output part including an output capacitor and a sensing resistor connected to each of the first inductor part and the second inductor part and connected to each other in series; and a switching part including the third switch connected to the one end of the AC voltage part and the fourth switch connected to the other end of the AC voltage part.

The first inductor part may further include a first diode having one end connected to the first inductor and the other end connected to one end of the output capacitor. One end of the first inductor may be connected to the one end of the AC voltage part, and the other end of the first inductor may be connected to each of one end of the first switch and the one end of the first diode. The one end of the first switch may be connected to the other end of the first inductor, and the other end of the first switch may be connected between the other end of the output capacitor and one end of the sensing resistor. The second inductor part may further include a second diode having one end connected to the second inductor and the other end connected to the one end of the output capacitor. One end of the second inductor may be connected to the other end of the AC voltage part, and the other end of the second inductor may be connected to each of one end of the second switch and the one end of the second diode. The one end of the second switch may be connected to the other end of the second inductor, and the other end of the second switch may be connected between the other end of the output capacitor and the one end of the sensing resistor.

One end of the third switch may be connected to the one end of the AC voltage part, and the other end of the third switch may be connected to the other end of the sensing resistor. One end of the fourth switch may be connected to the other end of the AC voltage part, and the other end of the fourth switch may be connected to the other end of the sensing resistor.

The one end of the AC voltage part may be a positive (+) terminal and the other end of the AC voltage part may be a negative (−) terminal. The selectively applying of the switch on/off signal to either the third switch or the fourth switch may include: turning off the third switch and turning on the fourth switch to apply the input voltage to the first inductor, when the input voltage is a positive (+) voltage; and turning on the third switch and turning off the fourth switch to apply the input voltage to the second inductor, when the input voltage is a negative (−) voltage.

The turning-on of the fourth switch may include: controlling the PFC circuit such that a current passing through the first inductor passes through the first switch, the sensing resistor, and the fourth switch, in a state where the first switch is turned on; and controlling the PFC circuit such that a current passing through the first inductor passes through the first diode, the output capacitor, the sensing resistor, and the fourth switch, in a state where the first switch is turned off.

The turning-on of the third switch may include: controlling the PFC circuit such that a current passing through the second inductor passes through the second switch, the sensing resistor, and the third switch, in a state where the second switch is turned on; and controlling the PFC circuit such that a current passing through the second inductor passes through the second diode, the output capacitor, the sensing resistor, and the third switch, in a state where the second switch is turned off.

The selectively applying of the switch on/off signal to either the third switch or the fourth switch may include: turning off the third switch and turning on the fourth switch to apply the input voltage to the first inductor when the input voltage is a positive (+) voltage; and turning on the third switch and turning off the fourth switch to apply the input voltage to the second inductor, when the input voltage is a negative (−) voltage. While the input voltage is applied to the first inductor, a sum of a voltage applied to the sensing resistor and a voltage applied to the fourth switch may be smaller than a voltage applied to the second switch. While the input voltage is applied to the second inductor, a sum of a voltage applied to the sensing resistor and a voltage applied to the third switch may be smaller than a voltage applied to the first switch.

The sensing resistor may be implemented as a transformer element configured to transform an AC voltage. The control method may include: controlling the transformer element such that a sum of a voltage transformed by the transformer element and a voltage applied to the fourth switch is smaller than a voltage applied to the second switch, while the input voltage is applied to the first inductor; and controlling the transformer element such that a sum of a voltage transformed by the transformer element and a voltage applied to the third switch is smaller than a voltage applied to the first switch, while the input voltage is applied to the second inductor.

The first switch and the second switch may have a relatively larger forward voltage drop than the third switch and the fourth switch, or the third switch and the fourth switch may have a relatively smaller turn-on resistance value than the first switch and the second switch.

The PFC circuit may further include a diode bridge, and the control circuit may charge the output capacitor through the diode bridge in an initial transient state.

A control method for controlling an operation of an electronic apparatus including a power factor correction circuit may be provided. The control method may include applying identical signals to switch on or switch off a first switch and a second switch; and based on a magnitude of an input voltage input through an AC voltage part, selectively applying a signal to switch off a third switch and a signal to switch on a fourth switch or selectively applying a signal to switch on the third switch and a signal to switch off the fourth switch; wherein the power factor correction circuit may include: a first inductor part including a first inductor connected to one end of the AC voltage part and the first switch connected to the first inductor in series; a second inductor part including a second inductor connected to the other end of the AC voltage part and the second switch connected to the second inductor in series; an output part including an output capacitor and a sensing resistor connected to each of the first inductor part and the second inductor part, and wherein the output capacitor and the sensing resistor are connected to each other in series; and a switching part including the third switch connected to the one end of the AC voltage part and the fourth switch connected to the other end of the AC voltage part.

The control method may include based on an input voltage being a positive voltage, applying the signal to switch off the third signal and the signal to switch on the fourth switch; and based on the input voltage being a negative voltage, applying the signal to switch on the third signal and the signal to switch off the fourth switch.

The control method may include, based on the fourth switch being turned on, applying a signal to turn on the first switch, to pass a current that passes through the first inductor pass through the first switch, the sensing resistor, and the fourth switch; and applying a signal to turn off the first switch, to pass the current that passes through the first inductor pass through a first diode, the sensing resistor, and the fourth switch.

The control method may include, based on the third switch being turned on, applying a signal to turn on the second switch, to pass a current that passes through the second inductor pass through the second switch, the sensing resistor, and the third switch; and applying a signal to turn off the second switch, to pass the current that passes through the second inductor pass through a second diode, the sensing resistor, and the third switch.

According to the various embodiments, even though a high-price DSP is not provided, a plurality of switching elements in the PFC circuit can be appropriately turned on or off using an analog IC, and a stable output voltage can be provided.

In addition, no reverse current occurs in the inductors, thereby minimizing power loss or heat generation of parts in the PFC circuit.

Additional and/or other aspects and advantages will be set forth in part in the description which follows and, in part, will be obvious from the description, or may be learned by practice.

BRIEF DESCRIPTION OF THE DRAWINGS

The above and/or other aspects of the disclosure will be more apparent by describing certain embodiments with reference to the accompanying drawings, in which.

DETAILED DESCRIPTION

Figure 1:
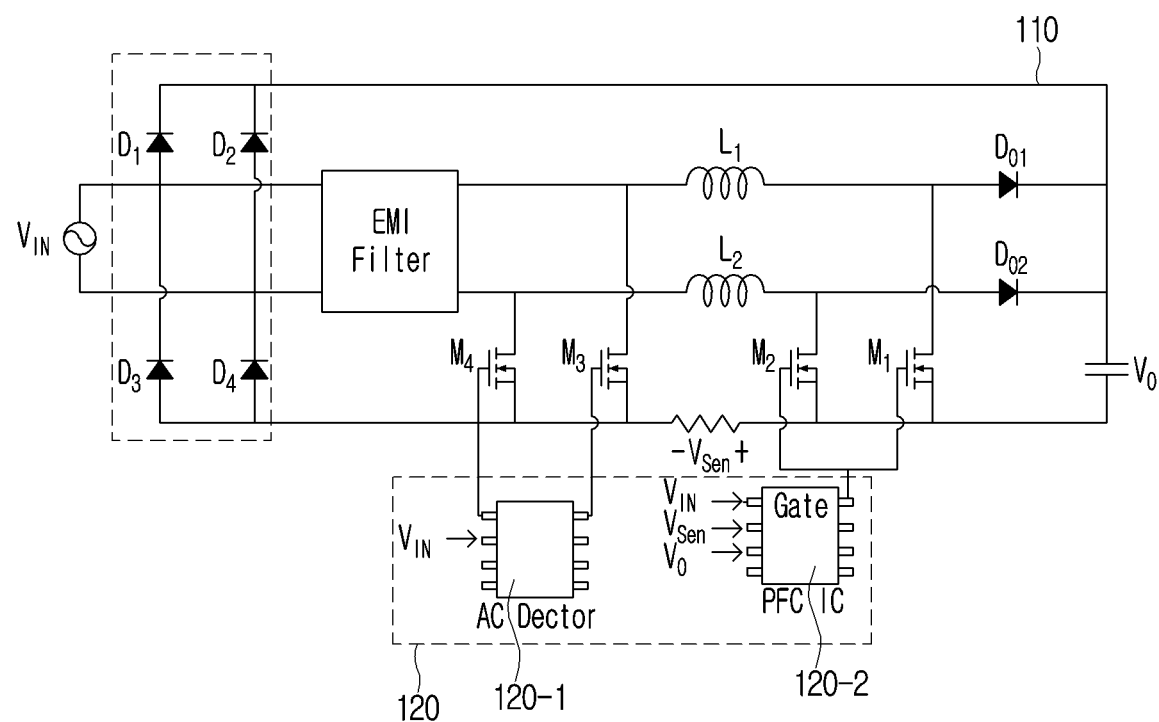
FIG. 1 is a circuit diagram for explaining a configuration of an electronic apparatus according to an embodiment.

After the terms used in the specification are briefly described, the disclosure will be described in detail.

The terms used with respect to the embodiments of the disclosure are selected from general terms that are currently in wide use if possible in consideration of functions in the disclosure, but may vary depending on intentions of those skilled in the art, precedents, the advent of new technologies, and the like. Also, for specific cases, meanings of terms arbitrarily selected by the applicant will be described in detail in the relevant description section of the disclosure. Accordingly, the terms used in the disclosure should be defined on the basis of the meanings of the terms and the contents throughout the disclosure rather than simple names of the terms.

The embodiments of the disclosure may be variously modified and have several embodiments, and specific embodiments will be illustrated in the drawings and described in detail in the detailed description. However, it is to be understood that the disclosure is not limited to the specific embodiments, but may include all modifications, equivalents, and substitutions falling within the spirit and the scope of the disclosure. In describing the embodiments, if it is determined that a detail description of a relevant known technology may obscure the gist of the disclosure, the detailed description thereof will be omitted.

The terms "first", "second", and the like, may be used to describe various components, but the components are not to be construed as being limited by these terms. The terms are used only to distinguish one component from another component.

Singular forms include plural forms unless the context clearly indicates otherwise. It should be further understood that the term "comprise", "include", or the like used herein specifies the presence of features, numerals, steps, operations, components, parts, or combinations thereof mentioned in the specification, but does not preclude the presence or addition of one or more other features, numerals, steps, operations, components, parts, or combinations thereof.

In the disclosure, a "module" or "unit" performs at least one function or operation, and may be implemented by hardware, software, or a combination of hardware and software. In addition, a plurality of "modules" or a plurality of "units" may be integrated into at least one module, except for the "module" or "unit" which needs to be implemented by specific hardware, and implemented by at least one processor (not illustrated).

Hereinafter, the embodiments of the disclosure will be described in detail with reference to the accompanying drawings to be easily carried out by those skill in the art. However, the disclosure is not limited to the embodiments described herein, but may be implemented in variously different forms. Also, parts unrelated to the detailed description are omitted in the drawings to ensure clarity of the disclosure. Like reference numerals in the drawings denote like elements throughout the specification.

FIG. 1 is a circuit diagram for explaining a configuration of an electronic apparatus according to an embodiment.

Referring to FIG. 1, the electronic apparatus 100 according to an embodiment may include a power factor correction (PFC) circuit 110 and a control circuit 120.

Here, the electronic apparatus 100 may receive an image signal by performing wired/wireless communication with an external apparatus such as a PC or a set-top box, may receive an image signal using a tuner or the like provided therein, or may acquire an image signal using image data stored in a storage provided in the electronic apparatus 100. Subsequently, the electronic apparatus 100 may provide the image signal to an external apparatus (e.g., a display apparatus).

Meanwhile, a power line of the electronic apparatus 100 is connected to a power outlet providing commercial power (e.g., 90 to 264 V), and the electronic apparatus 100 may transmit the commercial power to the external apparatus. The electronic apparatus 100 according to an embodiment may be implemented as any of various types of apparatuses supplying power to the external apparatus.

The external apparatus may be implemented as a display apparatus to display video data. Here, the display apparatus may be implemented as a TV, but is not limited thereto. The display apparatus may be applicable as any type of apparatus having a display function, including, but not limited to, a video wall, a large format display (LFD), a digital signage (digital signage), a digital information display (DID), or a projector display. Also, the display apparatus may be implemented as any of various types of displays, such as a liquid crystal display (LCD), an organic light-emitting diode (OLED) display, a liquid crystal on silicon (LCoS) display, a digital light processing (DLP) display, a quantum dot (QD) display panel, a quantum dot light-emitting diode (QLED) display, a micro light-emitting diode (µLED) display, and a mini LED display. In addition, the display apparatus may display the image signal received from the electronic apparatus 100, and may be driven using the power supplied from the electronic apparatus 100.

In the above-described example, the electronic apparatus 100 and the external apparatus have been described on the assumption that they are implemented as being separate from each other. However, the above-described example is merely an example and is not limited thereto. The electronic apparatus 100 and the external apparatus may be implemented as one apparatus. For example, the electronic apparatus 100 may be implemented as one component (e.g., a power supply) of the external apparatus.

The electronic apparatus 100 (e.g., a power supply) according to an embodiment may be implemented as a switched mode power supply (SMPS), and may include a power factor correction circuit, that is, a PFC circuit, to meet various regulations for coping with an increase in overall power consumption according to an increase in size of the electronic apparatus 100.

According to an embodiment of the disclosure, the power supply is hardware that stably supplies power to a load inside the electronic apparatus 100 (or an external apparatus) by converting AC power into DC power. The power supply may include a plurality of switches, and may perform a switch on/off control for each of the plurality of switches to provide stabilized power to the load. Meanwhile, the power supply according to an embodiment may, of course, include a diode bridge (or a bridge rectifier), an electromagnetic interference (EMI) filter unit, etc. For example, the diode bridge is a bridge circuit connecting four diodes to each other, and may be a component rectifying an AC input to change the AC input into a DC output. The EMI filter unit may remove electrical noise from commercial power.

The power supply according to an embodiment may include a PFC circuit 110. Here, the PFC circuit 110 may be implemented as any of various types of converters, such as a buck converter, a boost converter, and a buck-boost converter.

Meanwhile, among various types of conventional PFC circuits, a PFC circuit including a diode bridge has a problem that parts are heated and an electric conduction loss occurs in the diode bridge.

A PFC circuit (synchronous rectifier) using field effect transistors (FETs) instead of the diode bridge may solve the problem of the electric conduction loss, but four or more FETs are added to the PFC circuit, resulting in a problem that the number of elements constituting the PFC circuit increases.

A bridgeless PFC circuit, which may include no diode bridge, has a problem that: a high-price digital signal processor (DSP) is included to appropriately apply a gate signal for a switch on/off control (e.g., a signal supplied to a gate to allow a current to flow through a switch) to each of the plurality of switches provided in the PFC circuit; a current transformer (CT) is included to sense currents flowing through a plurality of inductors provided in the PFC circuit; or a reverse current flows through an element (e.g., a diode) in the PFC circuit by as much as a difference between the currents flowing through the plurality of inductors, causing generation of heat or occurrence of power loss. Hereinafter, the switch on/off control is switch on control or switch off control.

According to various embodiments of the disclosure, the electronic apparatus 100 may include a PFC circuit 110 having a diode bridge and a control circuit 120. In particular, the control circuit 120 may be implemented as one or more analog ICs (e.g., a first IC circuit 120-1 and a second IC circuit 120-2) rather than a high-price DSP.

The PFC circuit 110 according to an embodiment is controlled by the control circuit 120 that may be implemented as an analog IC or the like, rather than a high-price DSP, and is capable of operating similarly to the bridgeless PFC circuit after an initial transient state, e.g., in a normal state, even though the diode bridge is included therein, thereby solving the problem that parts are heated and an electric conduction loss occurs in the diode bridge. Hereinafter, a configuration and an operation of the PFC circuit 110 will be described.

Figure 2:
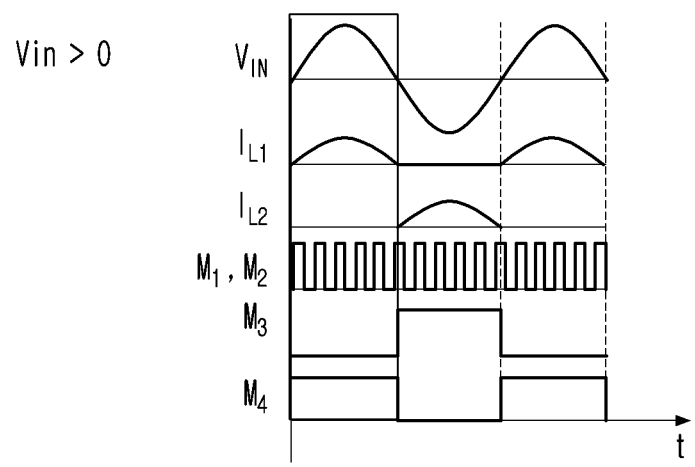
FIG. 2 is a graph for explaining an AC voltage and signal waveforms of switching elements according to an embodiment.

FIG. 2 is a graph for explaining an AC voltage and signal waveforms of switching elements according to an embodiment of the disclosure.

Referring to FIG. 2, the control circuit 120 identically applies a switch on/off signal to each of a first switch 20-1 ($M_1$) and a second switch 20-2 ($M_2$) provided in the PFC circuit 110. Hereinafter, a switch on/off signal is a switch on signal or a switch off signal.

In addition, the control circuit 120 may selectively apply a switch on/off signal to either a third switch 20-3 ($M_3$) or a fourth switch 20-4 ($M_4$) based on a magnitude of a voltage input through an AC voltage part $V_{IN}$.

For example, referring to FIG. 2, when the voltage input through the AC voltage part is a positive (+) voltage, the control circuit 120 may turn off the third switch 20-3 ($M_3$) provided in the PFC circuit 110 and turn on the fourth switch 20-4 ($M_4$).

Meanwhile, in the disclosure, "the turning-on of the switch" refers to changing the switch from a non-conducting state to a conducting state. In particular, it means supplying a signal to a gate to allow a current to flow through the switch. On the other hand, "the turning-off of the switch" refers to changing the switch from a conducting state to a non-conducting state.

Referring to FIG. 2, when the voltage input through the AC voltage part is a positive (+) voltage, the control circuit 120 may turn on/off (i.e., on or off) the first switch 20-1 ($M_1$) and the second switch 20-2 ($M_2$) simultaneously, turn off the third switch 20-3 ($M_3$), and turn on the fourth switch 20-4 ($M_4$).

At this time, a current flows through a first inductor ($L_1$) provided in the PFC circuit 110, and no current flows through a second inductor ($L_2$). A current flow and a detailed configuration of the PFC circuit 110 will be described with reference to FIG. 3.

Figure 3:
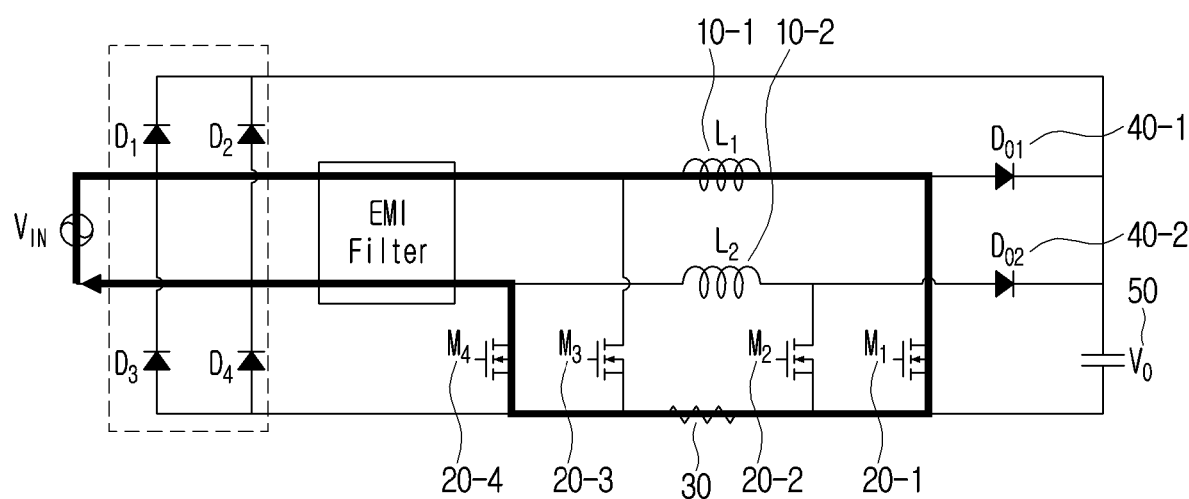
FIG. 3 is a circuit diagram for explaining a current flow in a state where a first switch is turned on according to an embodiment.

FIG. 3 is a circuit diagram for explaining a current flow in a state where the first switch is turned on according to an embodiment of the disclosure.

Referring to FIG. 3, the PFC circuit 110 may include a first inductor part including the first inductor 10-1 ($L_1$) connected to one end of the AC voltage part $V_{IN}$ and the first switch 20-1 ($M_1$) connected to the first inductor 10-1 in series.

Further, the PFC circuit 110 may include a second inductor part including the second inductor 10-2 ($L_2$) connected to the other end of the AC voltage part $V_{IN}$ and the second switch 20-2 ($M_2$) connected to the second inductor 10-2 in series.

In addition, the PFC circuit 110 may include an output part including an output capacitor 50 ($V_O$) and a sensing resistor 30 connected to each of the first inductor part and the second inductor part and connected to each other in series.

The first switch 20-1 ($M_1$) is connected to the output capacitor 50 ($V_O$) in parallel through a first diode 40-1 ($D_{O1}$), and the second switch 20-2 ($M_2$) is connected to the output capacitor 50 in parallel through a second diode 40-2 ($D_{O2}$).

For convenience of explanation, the first inductor 10-1, the first switch 20-1 ($M_1$), and the first diode 40-1 having one end connected to the first inductor 10-1 and the other end connected to one end of the output capacitor 50 will be referred to as the first inductor part.

According to an embodiment of the disclosure, one end of the first inductor 10-1 is connected to one end of the AC voltage part $V_{IN}$, and the other end of the first inductor 10-1 is connected to each of one end of the first switch 20-1 ($M_1$) and one end of the first diode 40-1.

According to an embodiment of the disclosure, one end of the first switch 20-1 ($M_1$) is connected to the other end of the first inductor 10-1, and the other end of the first switch 20-1 ($M_1$) is connected between the other end of the output capacitor 50 and one end of the sensing resistor 30.

According to an embodiment of the disclosure, the second inductor 10-2, the second switch 20-2 ($M_2$), and the second diode 40-2 having one end connected to the second inductor 10-2 and the other end connected to one end of the output capacitor 50 will be referred to as the second inductor part.

According to one embodiment of the disclosure, one end of the second inductor 10-2 is connected to the other end of the AC voltage part VIN, and the other end of the second inductor 10-2 is connected to each of one end of the second switch 20-2 ($M_2$) and one end of the second diode 40-2.

According to one embodiment of the disclosure, one end of the second switch 20-2 ($M_2$) is connected to the other end of the second inductor 10-2, and the other end of the second switch 20-2 ($M_2$) is connected between the other end of the output capacitor 50 and one end of the sensing resistor 30.

The PFC circuit 110 may include a switching part including the third switch 20-3 ($M_3$) connected to one end of the AC voltage part $V_{IN}$ and the fourth switch 20-4 ($M_4$) connected to the other end of the AC voltage part $V_{IN}$.

Specifically, one end of the third switch 20-3 ($M_3$) is connected to one end of the AC voltage part $V_{IN}$, and the other end of the third switch 20-3 ($M_3$) is connected to the other end of the sensing resistor 30. One end of the fourth switch 20-4 ($M_4$) is connected to the other end of the AC voltage part $V_{IN}$, and the other end of the fourth switch 20-4 ($M_4$) is connected to the other end of the sensing resistor 30.

Here, one end of the AC voltage part $V_{IN}$ may refer to a positive (+) terminal, and the other end of the AC voltage part $V_{IN}$ may refer to a negative (−) terminal.

The control circuit 120 according to an embodiment may turn off the third switch 20-3 ($M_3$) and turn on the fourth switch 20-4 ($M_4$) to apply the input voltage to the first inductor 10-1, when the input voltage is a positive (+) voltage.

As an example, the control circuit 120 may repeatedly turn on and turn off the first switch 20-1 ($M_1$) while turning off the third switch 20-3 ($M_3$) and turning on the fourth switch 20-4 ($M_4$).

First, the control circuit 120 may control the PFC circuit 110 such that a current passing through the first inductor 10-1 passes through the first switch 20-1 ($M_1$), the sensing resistor 30, and the fourth switch 20-4 ($M_4$), as illustrated in FIG. 3, by turning on the first switch 20-1 ($M_1$) while turning on the fourth switch 20-4 ($M_4$).

Figure 4:
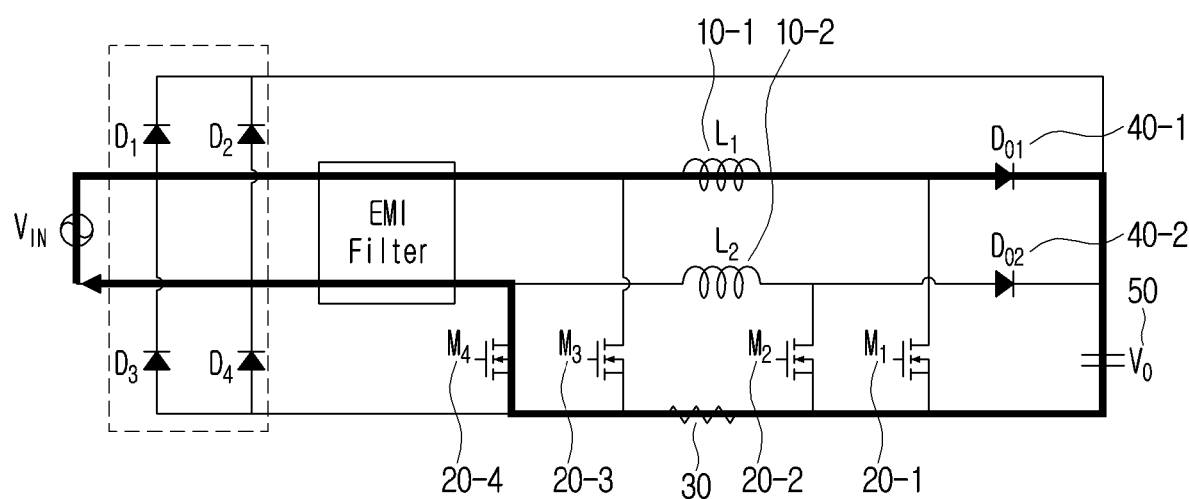
FIG. 4 is a circuit diagram for explaining a current flow in a state where the first switch is turned off according to an embodiment.

FIG. 4 is a circuit diagram for explaining a current flow in a state where the first switch is turned off according to an embodiment of the disclosure.

Referring to FIG. 4, following FIG. 3, the control circuit 120 may control the PFC circuit 110 such that a current passing through the first inductor 10-1 to pass through the first diode 40-1, the output capacitor ($V_O$), and the fourth switch 20-4 ($M_4$), by turning off the first switch 20-1 ($M_1$) while turning on the fourth switch 20-4 ($M_4$).

Figure 5:
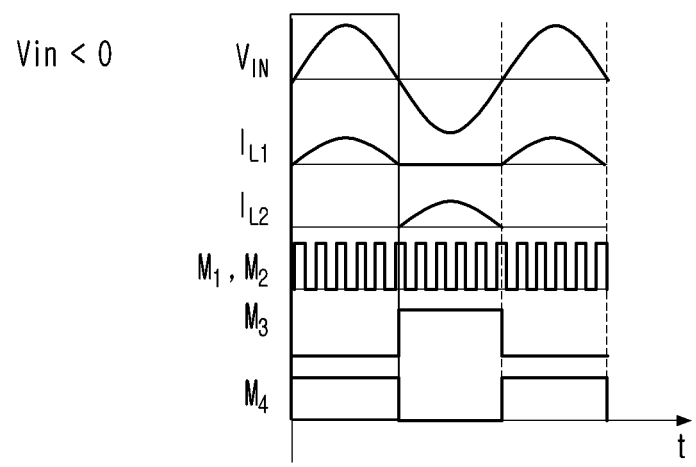
FIG. 5 is a graph for explaining an AC voltage and signal waveforms of switching elements according to an embodiment.

FIG. 5 is a graph for explaining an AC voltage and signal waveforms of switching elements according to an embodiment of the disclosure.

Subsequently, the control circuit 120 according to an embodiment may turn on the third switch 20-3 ($M_3$) and turn off the fourth switch 20-4 ($M_4$), as illustrated in the graph of FIG. 5, to apply the input voltage to the second inductor 10-2, when the input voltage is a negative (−) voltage.

As an example, the control circuit 120 may repeatedly turn on and turn off the second switch 20-2 ($M_2$) while turning on the third switch 20-3 ($M_3$) and turning off the fourth switch 20-4 ($M_4$). When the input voltage is a negative (−) voltage, a current flow in the PFC circuit 110 according to the control of the control circuit 120 will be described with reference to FIGS. 6 and 7.

Figure 6:
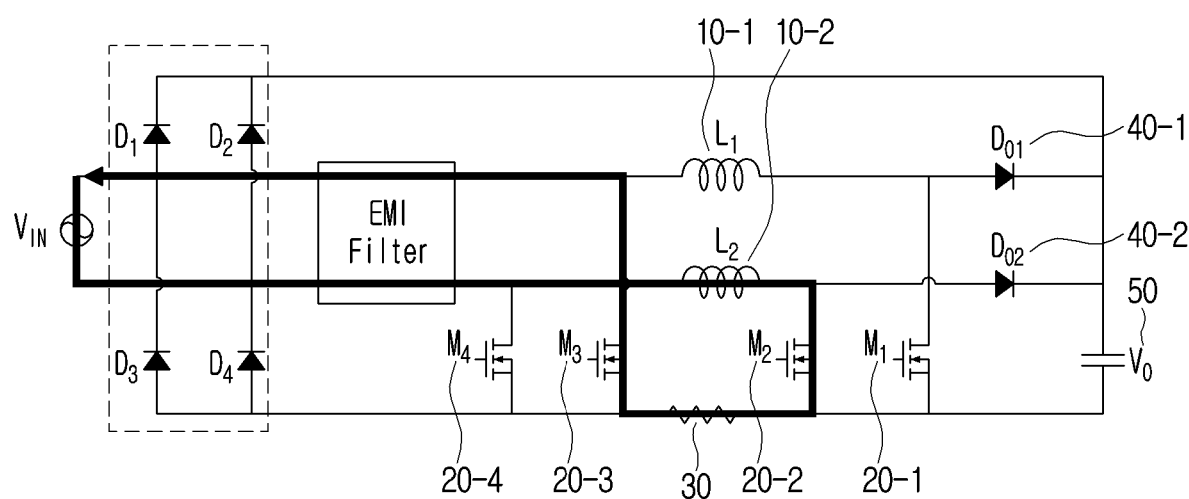
FIG. 6 is a circuit diagram for explaining a current flow in a state where a second switch is turned on according to an embodiment.

FIG. 6 is a circuit diagram for explaining a current flow in a state where the second switch is turned on according to an embodiment of the disclosure.

First, the control circuit 120 may control the PFC circuit 110 such that a current passing through the second inductor 10-2 passes through the second switch 20-2 ($M_2$), the sensing resistor 30, and the third switch 20-3 ($M_3$), as illustrated in FIG. 6, by turning on the second switch 20-2 ($M_2$) while turning on the third switch 20-3 ($M_3$).

Figure 7:
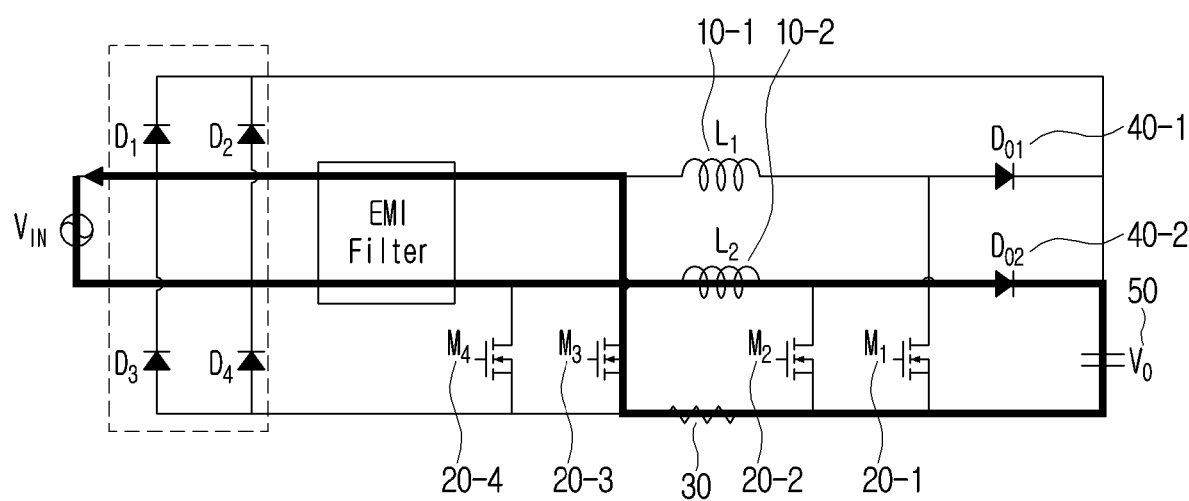
FIG. 7 is a circuit diagram for explaining a current flow in a state where the second switch is turned off according to an embodiment.

FIG. 7 is a circuit diagram for explaining a current flow in a state where the second switch is turned off according to an embodiment of the disclosure.

Referring to FIG. 7, following FIG. 6, the control circuit 120 may control the PFC circuit 110 such that a current passing through the second inductor 10-2 passes through the second diode 40-2, the output capacitor ($V_O$), and the third switch 20-3 ($M_3$), by turning off the second switch 20-2 ($M_2$) while turning on the third switch 20-3 ($M_3$).

Meanwhile, referring to the graphs illustrated in FIGS. 2 and 5, while the current flows through the first inductor 10-1, no current flows through the second inductor 10-2, that is, a reverse current, which causes generation of heat or occurrence of power loss, does not occur. Also, while the current flows through the second inductor 10-2, no current flows through the first inductor 10-1.

Hereinafter, a structural feature of the PFC circuit 110 capable of causing no reverse current in the first inductor 10-1 and the second inductor 10-2 will be described with reference to an equivalent circuit of the PFC circuit 110.

Figure 8:
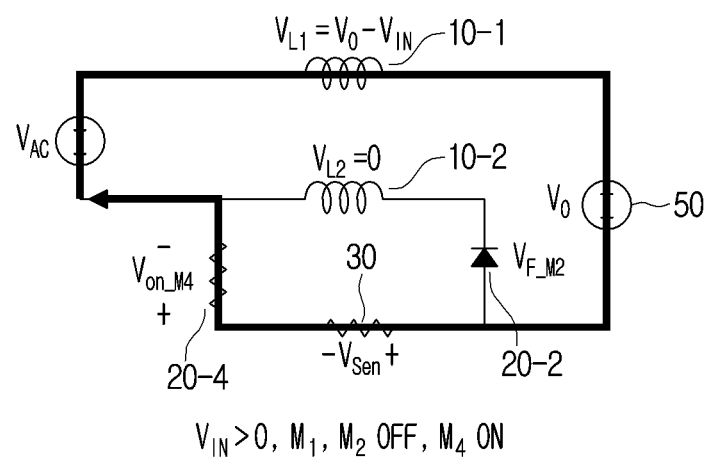
FIG. 8 is a diagram for explaining an equivalent circuit according to an embodiment.
Figure 8:
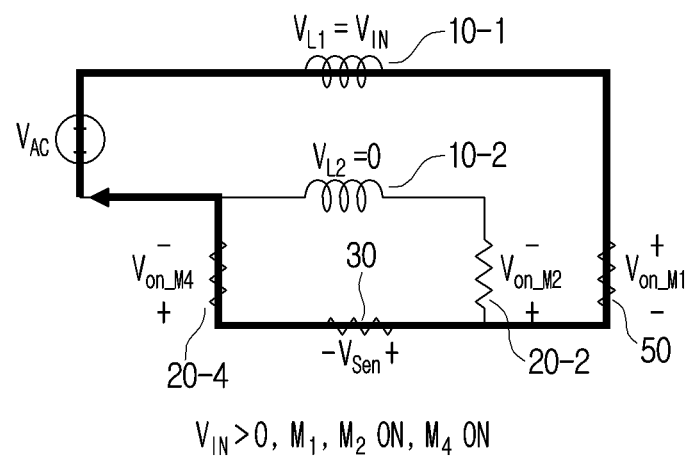

FIG. 8 is a diagram for explaining an equivalent circuit according to an embodiment of the disclosure.

The left circuit of FIG. 8 is an equivalent circuit illustrated for a state where the first switch 20-1 ($M_1$) and the second switch 20-2 ($M_2$) are turned off and the fourth switch 20-4 ($M_4$) is turned on while the input voltage is a positive (+) voltage, that is, the same state as that of the PFC circuit 110 illustrated in FIG. 4.

When the first switch 20-1 ($M_1$) and the second switch 20-2 ($M_2$) are turned off while the input voltage is a positive (+) voltage, a current passing through the first inductor 10-1 may pass through the output capacitor 50, the sensing resistor 30, and the fourth switch 20-4 ($M_4$).

Here, referring to FIG. 8, a voltage $V_{L2}$ applied to the second inductor 10-2 is voltage $V_{on\_M4}$ applied to fourth switch 20-4 ($M_4$)+voltage $V_{sen}$ applied to sensing resistor 30−voltage $V_{F\_M2}$ applied to second switch 20-2 ($M_2$) in turn-off state.

Accordingly, in order for no current to flow through the second inductor 10-2, it is required to satisfy a condition according to Equation 1 below.

voltage $V_{on\_M4}$ applied to fourth switch 20-4 ($M_4$)+ voltage $V_{sen}$ applied to sensing resistor 30<voltage $V_{F\_M2}$ applied to second switch 20-2 ($M_2$) in turn-off state  Equation 1

The right circuit of FIG. 8 is an equivalent circuit illustrated for a state where the first switch 20-1 ($M_1$) and the second switch 20-2 ($M_2$) are turned on and the fourth switch 20-4 ($M_4$) is turned on while the input voltage is a positive (+) voltage, that is, the same state as that of the PFC circuit 110 illustrated in FIG. 3.

When the first switch 20-1 ($M_1$) and the second switch 20-2 ($M_2$) are turned on while the input voltage is a positive (+) voltage, a current passing through the first inductor 10-1 may pass through the sensing resistor 30 and the fourth switch 20-4 ($M_4$).

Here, referring to FIG. 8, a voltage $V_{L2}$ applied to the second inductor 10-2 is voltage $V_{on\_M4}$ applied to fourth switch 20-4 ($M_4$)+voltage $V_{sen}$ applied to sensing resistor 30−voltage $V_{on\_M2}$ applied to the second switch 20-2 ($M_2$) in turn-on state.

Accordingly, in order for no current to flow through the second inductor 10-2, it is required to satisfy a condition according to Equation 2 below.

voltage $V_{on\_M4}$ applied to fourth switch 20-4 ($M_4$)+ voltage $V_{sen}$ applied to sensing resistor 30<voltage $V_{on\_M2}$ applied to second switch 20-2 ($M_2$) in turn-on state  Equation 2

Referring to Equations 1 and 2, while the input voltage is applied to the first inductor 10-1, a sum of a voltage $V_{sen}$ applied to the sensing resistor 30 and a voltage $V_{on\_M4}$ applied to the fourth switch 20-4 ($M_4$) in the turn-on state may be smaller than a voltage $V_{F\_M2}$ or $V_{on\_M2}$ applied to the second switch in the turn-on or turn-off state.

As another example, when i) the first switch 20-1 ($M_1$) and the second switch 20-2 ($M_2$) are turned off and the third switch 20-3 ($M_3$) is turned on while the input voltage is a negative (−) voltage, or ii) the first switch 20-1 ($M_1$) and the second switch 20-2 ($M_2$) are turned on and the third switch 20-3 ($M_3$) is turned off while the input voltage is a negative (−) voltage, the input voltage is applied to the second inductor 10-2.

Subsequently, while the input voltage is applied to the second inductor 10-2, a sum of a voltage $V_{sen}$ applied to the sensing resistor 30 and a voltage $V_{on\_M3}$ applied to the third switch 20-3 ($M_3$) in the turn-on state may be smaller than a voltage $V_{F\_M1}$ or $V_{on\_M1}$ applied to the first switch in the turn-on or turn-off state.

To satisfy the above-described conditions, the elements provided in the PFC circuit 110 may be elements having the following characteristics.

The first switch 20-1 ($M_1$) and the second switch 20-2 ($M_2$) may be implemented as elements having a relatively larger forward voltage drop $V_F$ than the third switch 20-3 ($M_3$) and the fourth switch 20-4 ($M_4$).

As an example, the first switch 20-1 ($M_1$) and the second switch 20-2 ($M_2$) may be implemented as high-voltage switching elements. Examples of the high-voltage switching elements include, but not necessarily limited to, double-diffused metal oxide semiconductor field effect transistors (DMOSFETs), insulated gate bipolar transistors (IGBTs), extended drain MOSFETs (EDMOSFETs), lateral double-diffused MOSFETs (LDMOSFETs), SiC MOSFETs, and gallium nitride (GaN) MOSFETs. As another example, the third switch 20-3 ($M_3$) and the fourth switch 20-4 ($M_4$) may be implemented as Si MOSFETs or the like, but are not necessarily limited thereto.

In addition, the third switch 20-3 ($M_3$) and the fourth switch 20-4 ($M_4$) may have a relatively smaller turn-on resistance value RDS ON than the first switch 20-1 ($M_1$) and the second switch 20-2 ($M_2$).

Here, the turn-on resistance value may refer to a resistance value between a drain and a source when the switch is turned on. The smaller the turn-on resistance value, the less the power loss when the switch is turned on.

Figure 9:
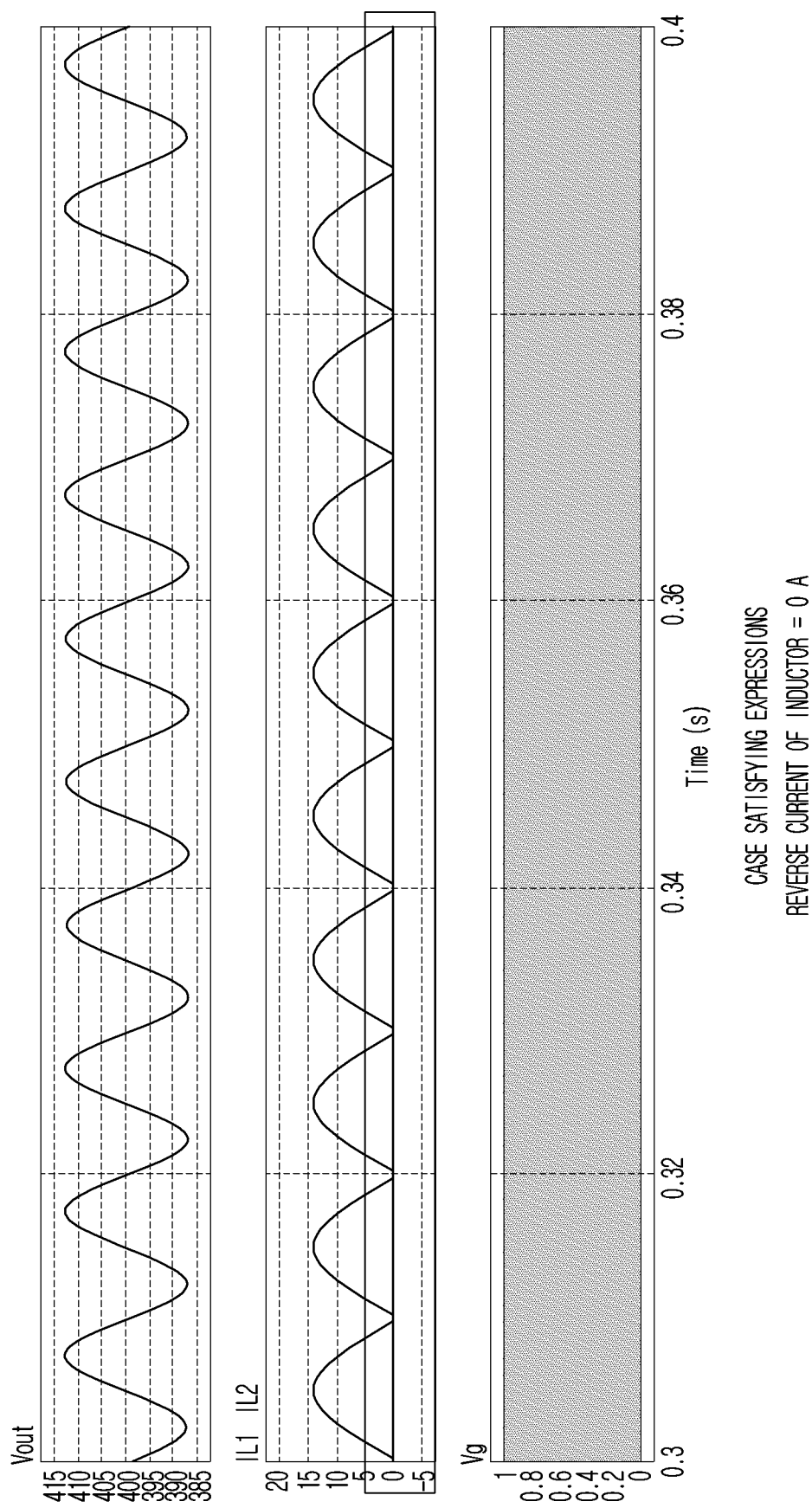
FIG. 9 is a graph for explaining a current flowing through an inductor in a circuit according to an embodiment.

FIG. 9 is a graph for explaining a current flowing through an inductor in a circuit according to an embodiment of the disclosure.

Referring to FIG. 9, no reverse current occurs in each of the first inductor 10-1 and the second inductor 10-2, and accordingly, no heat is generated in the elements, and a power loss is reduced.

Figure 10:
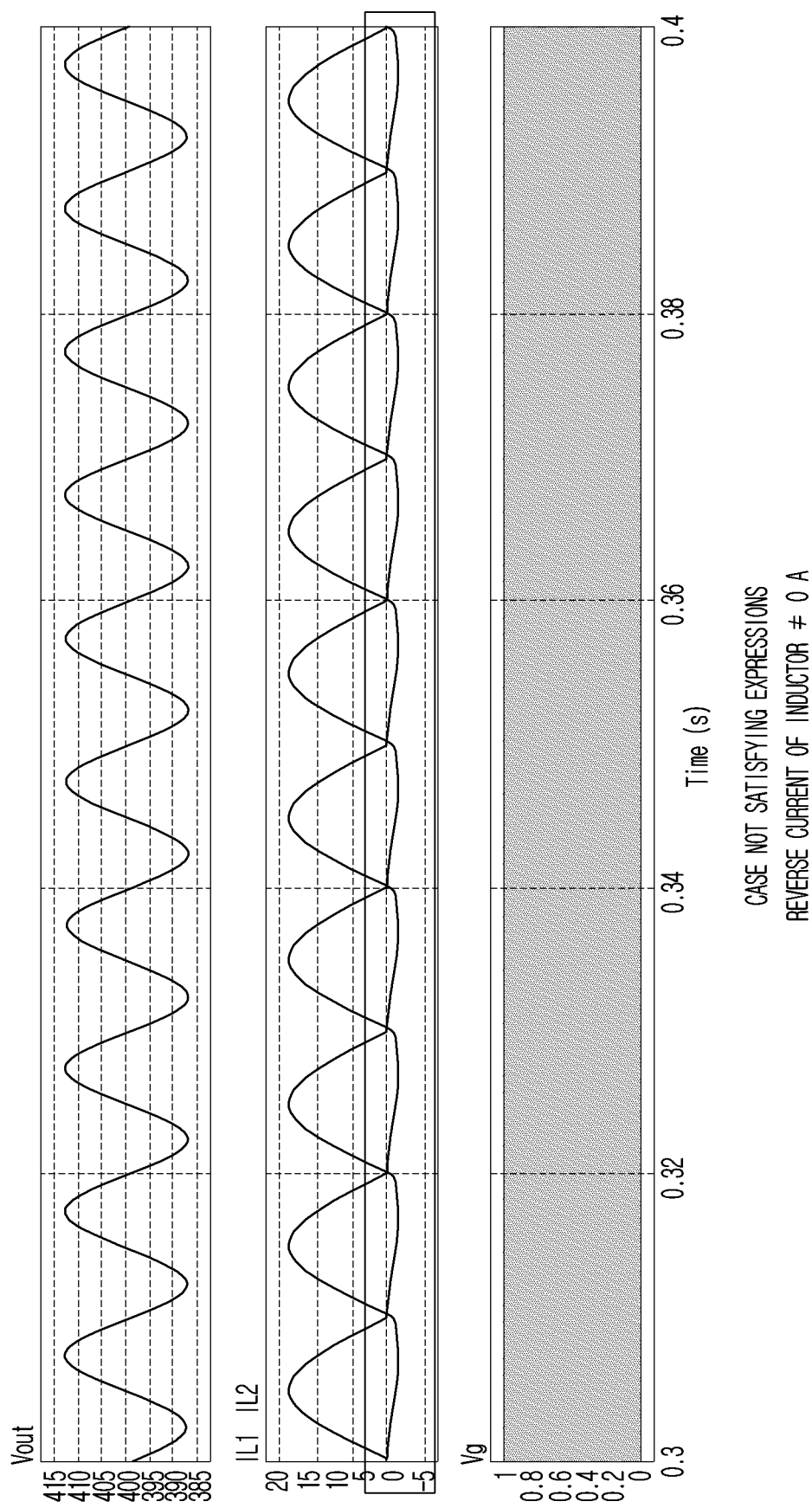
FIG. 10 is a graph for explaining a current flowing through an inductor in a circuit according to a conventional configuration.

FIG. 10 is a graph for explaining a current flowing through an inductor in a circuit according to a conventional configuration.

Specifically, FIG. 10 is a graph for explaining an example in which a reverse current occurs in each of the first inductor 10-1 and the second inductor 10-2 in a case where the PFC circuit does not satisfy the above-described conditions, for example, the conditions according to Equations 1 and 2.

Referring to FIG. 9, it can be seen that when a current flows through the first inductor 10-1, a magnitude of a current flowing through the second inductor 10-2 is 0, that is, no current flows through the second inductor 10-2. As another example, it can be seen that when a current flows through the second inductor 10-2, a magnitude of a current flowing through the first inductor 10-1 is 0, that is, no current flows through the first inductor 10-1.

In contrary, referring to FIG. 10, it can be seen that when a current flows through the first inductor 10-1, a current having a magnitude less than 0, that is, a reverse current, flows through the second inductor 10-2. As another example, it can be seen that when a current flows through the second inductor 10-2, a current having a magnitude less than 0, that is, a reverse current, flows through the first inductor 10-1.

As illustrated in FIG. 9, in the PFC circuit 110 according to various embodiments of the disclosure, while a current flows through one of the first inductor 10-1 and the second inductor 10-2, no current flows through the other inductor, resulting in an advantageous effect in that generation of heat and occurrence of power loss can be minimized.

Figure 11:
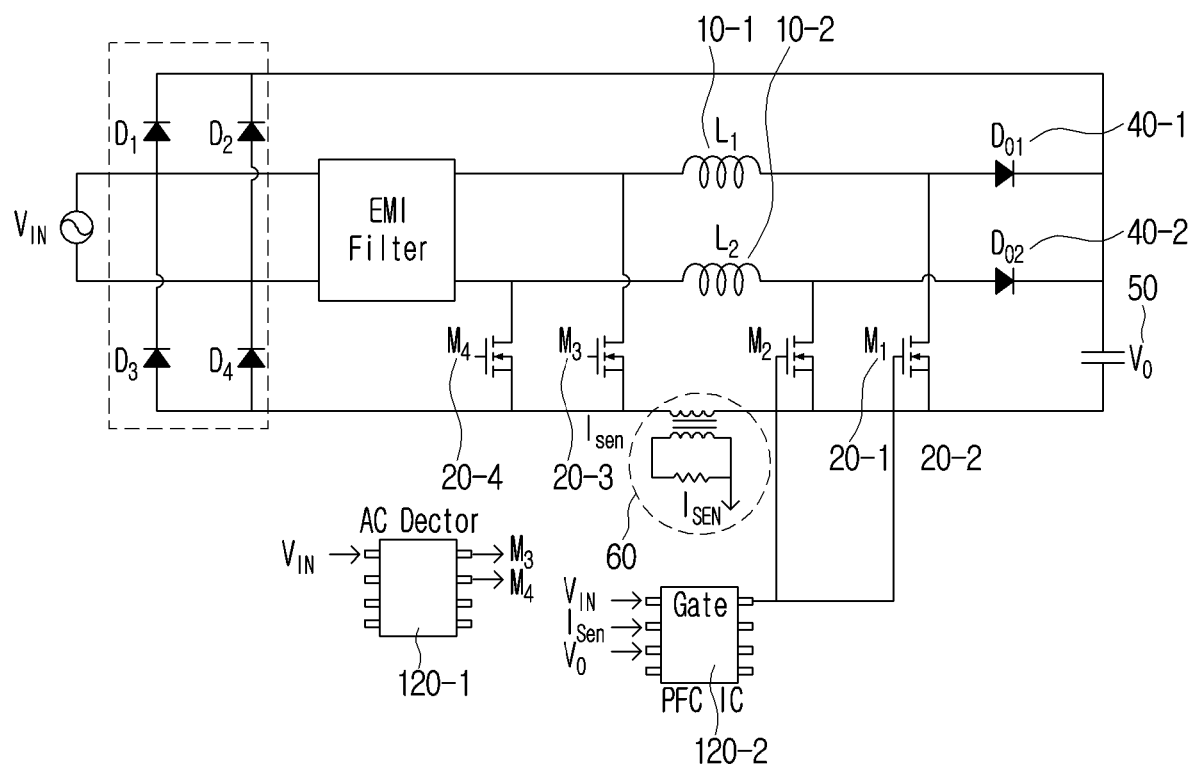
FIG. 11 is a circuit diagram for explaining a transformer element according to an embodiment.

FIG. 11 is a circuit diagram for explaining a transformer element according to an embodiment of the disclosure.

According to another embodiment of the disclosure, the PFC circuit 110 may include a transformer element 60 for transforming an AC voltage instead of the sensing resistor 30.

The control circuit 120 according to an embodiment may control the transformer element 60 such that a sum of a voltage transformed by the transformer element 60 and a voltage applied to the fourth switch 20-4 ($M_4$) is smaller than a voltage applied to the second switch 20-2 ($M_2$), while the input voltage is applied to the first inductor 10-1. That is, in the above-described Equations 1 and 2, the voltage $V_{sen}$ applied to the sensing resistor 30 may be replaced with the voltage transformed by the transformer element 60, and the control circuit 120 may control a magnitude of the voltage transformed by the transformer element 60 such that the PFC circuit 110 satisfies the conditions according to Equations 1 and 2.

As another example, the control circuit 120 may control the transformer element 60 such that a sum of a voltage transformed by the transformer element 60 and a voltage applied to the third switch 20-3 ($M_3$) is smaller than a voltage applied to the first switch 20-1 ($M_1$), while the input voltage is applied to the second inductor 10-2.

With reference to FIGS. 1 to 10, the switch on/off control of each of the first to fourth switches 20-1 to 20-4 ($M_1$ to $M_4$), the current flow, and the charging of the output capacitor 50 have been described above on the assumption that the PFC circuit 110 is in a normal state.

Hereinafter, a current flow will be described assuming that the PFC circuit 110 is in an initial transient state.

Figure 12:
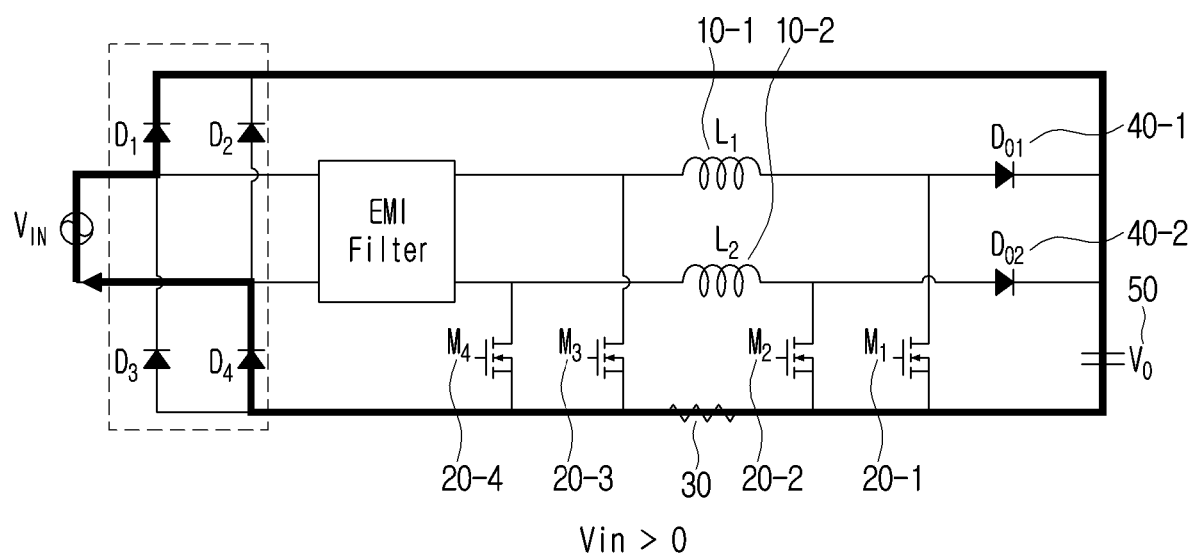
FIG. 12 is a circuit diagram for explaining an initial transient state according to an embodiment.
Figure 12:
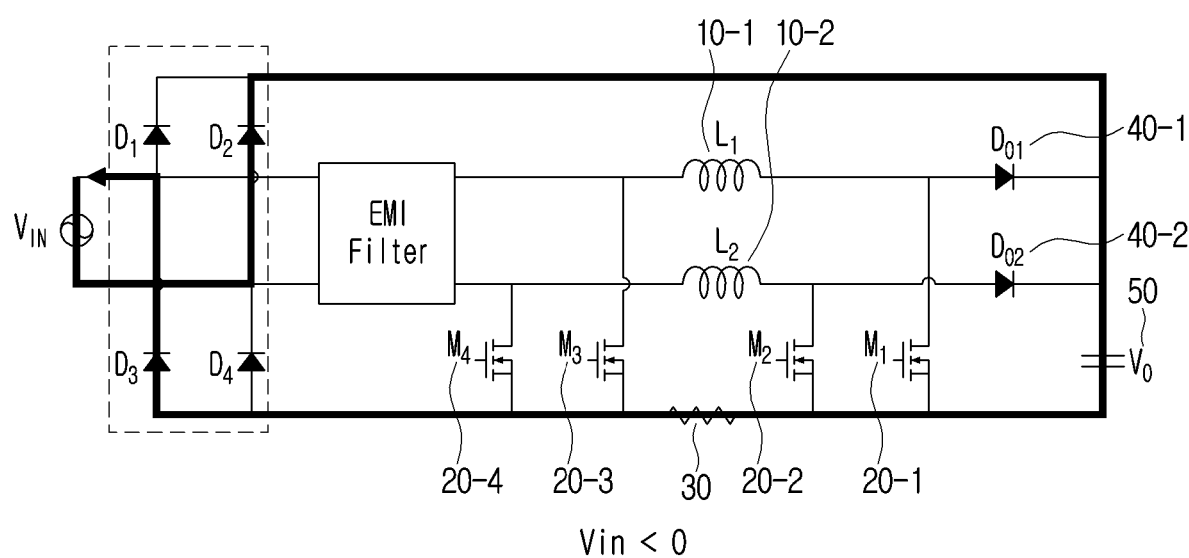

FIG. 12 is a circuit diagram for explaining an initial transient state according to an embodiment of the disclosure.

Referring to FIG. 12, the PFC circuit 110 may include a diode bridge.

Subsequently, the control circuit 120 may charge the output capacitor 50 through the diode bridge in the initial transient state.

As illustrated in FIG. 12, a current flow when the input voltage is a positive (+) voltage is different from that when the input voltage is a negative (−) voltage.

When the input voltage is initially applied to the PFC circuit 110, a current flow is generated only through diodes $D_1$ and $D_4$ or diodes $D_2$ and $D_3$, which are included in the diode bridge, until a voltage of the output capacitor ($V_O$) becomes equal to the input voltage, as illustrated in FIG. 12. Thus, the PFC circuit 110 is capable of operating similarly to a conventional diode bridge PFC circuit in the initial transient state.

Meanwhile, the control circuit 120 may be implemented as a digital signal processor (DSP) processing a digital image signal, a microprocessor, and a timing controller (T-CON), but is not limited thereto. The control circuit 120 may include one or more of a central processing unit (CPU), a micro controller unit (MCU), a micro processing unit (MPU), a controller, an application processor. (AP) or a communication processor (CP), and an advanced RISC machine (ARM) processor, or may be defined by a corresponding term. Also, the control circuit 120 may be implemented as a system on chip (SoC) having a processing algorithm stored therein or large scale integration (LSI), or may be implemented in the form of a field programmable gate array (FPGA).

The control circuit 120 according to an embodiment may include: a first IC circuit 120-1 detecting a magnitude of an input voltage and applying a switch on/off signal to each of the third switch 20-3 ($M_3$) and the fourth switch 20-4 ($M_4$); and a second IC circuit 120-2 detecting an input voltage, a voltage applied to the sensing resistor, and a voltage charged in the output capacitor, and applying a switch on/off signal to each of the first switch 20-1 ($M_1$) and the second switch 20-2 ($M_2$) based on a magnitude of the voltage charged in the output capacitor, and each of the first IC circuit 120-1 and the second IC circuit 120-2 may be implemented as an analog IC circuit.

Figure 13:
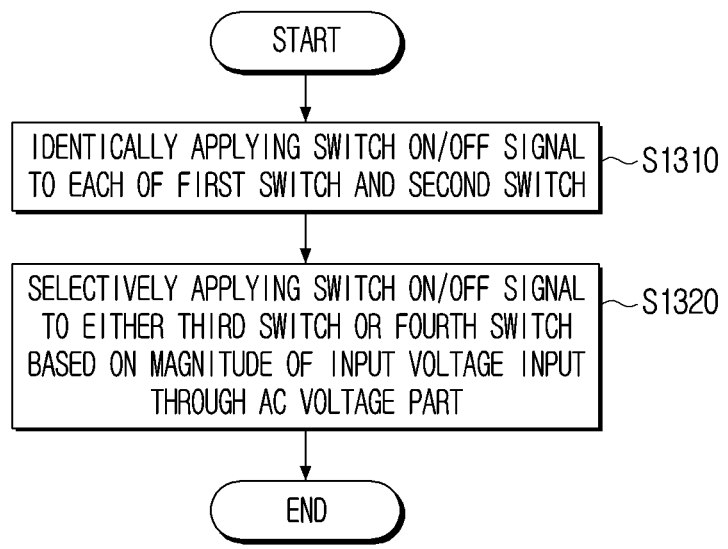
FIG. 13 is a flowchart for explaining a control method of an electronic apparatus according to an embodiment.

FIG. 13 is a flowchart for explaining a control method of an electronic apparatus according to an embodiment of the disclosure.

According to an embodiment of the disclosure, the control method of the electronic apparatus including a power factor correction (PFC) circuit and a control circuit controlling an operation of the PFC circuit may include: identically applying a switch on/off signal to each of a first switch and a second switch, (S1310), and selectively applying a switch on/off signal to either a third switch or a fourth switch based on a magnitude of an input voltage input through an AC voltage part (S1320).

Here, the PFC circuit may include: a first inductor part including a first inductor connected to one end of the AC voltage part and the first switch connected to the first inductor in series; a second inductor part including a second inductor connected to the other end of the AC voltage part and the second switch connected to the second inductor in series; an output part including an output capacitor and a sensing resistor connected to each of the first inductor part and the second inductor part and connected to each other in series; and a switching part including the third switch connected to one end of the AC voltage part and the fourth switch connected to the other end of the AC voltage part.

Here, the first inductor part may further include a first diode having one end connected to the first inductor and the other end connected to one end of the output capacitor. One end of the first inductor may be connected to one end of the AC voltage part, and the other end of the first inductor may be connected to each of one end of the first switch and one end of the first diode. One end of the first switch may be connected to the other end of the first inductor, and the other end of the first switch may be connected between the other end of the output capacitor and one end of the sensing resistor. Also, the second inductor part may further include a second diode having one end connected to the second inductor and the other end connected to one end of the output capacitor. One end of the second inductor may be connected to the other end of the AC voltage part, and the other end of the second inductor may be connected to each of one end of the second switch and one end of the second diode. One end of the second switch may be connected to the other end of the second inductor, and the other end of the second switch may be connected between the other end of the output capacitor and one end of the sensing resistor.

Here, one end of the third switch may be connected to one end of the AC voltage part, and the other end of the third switch may be connected to the other end of the sensing resistor. One end of the fourth switch may be connected to the other end of the AC voltage part, and the other end of the fourth switch may be connected to the other end of the sensing resistor.

According to an embodiment of the disclosure, one end of the AC voltage part may be a positive (+) terminal and the other end of the AC voltage part may be a negative (−) terminal. Operation S1320 of selectively applying the switch on/off signal to either the third switch or the fourth switch may include: turning off the third switch and turning on the fourth switch to apply the input voltage to the first inductor, when the input voltage is a positive (+) voltage; and turning on the third switch and turning off the fourth switch to apply the input voltage to the second inductor, when the input voltage is a negative (−) voltage.

Here, the turning-on of the fourth switch may include: controlling the PFC circuit such that a current passing through the first inductor passes through the first switch, the sensing resistor, and the fourth switch, in a state where the first switch is turned on; and controlling the PFC circuit such that a current passing through the first inductor passes through the first diode, the output capacitor, the sensing resistor, and the fourth switch, in a state where the first switch is turned off.

Also, the turning-on of the third switch may include: controlling the PFC circuit such that a current passing through the second inductor passes through the second switch, the sensing resistor, and the third switch, in a state where the second switch is turned on; and controlling the PFC circuit such that a current passing through the second inductor passes through the second diode, the output capacitor, the sensing resistor, and the third switch, in a state where the second switch is turned off.

According to an embodiment of the disclosure, operation S1320 of selectively applying the switch on/off signal to either the third switch or the fourth switch may include: turning off the third switch and turning on the fourth switch to apply the input voltage to the first inductor, when the input voltage is a positive (+) voltage; and turning on the third switch and turning off the fourth switch to apply the input voltage to the second inductor, when the input voltage is a negative (−) voltage. While the input voltage is applied to the first inductor, a sum of a voltage applied to the sensing resistor and a voltage applied to the fourth switch may be smaller than a voltage applied to the second switch. While the input voltage is applied to the second inductor, a sum of a voltage applied to the sensing resistor and a voltage applied to the third switch may be smaller than a voltage applied to the first switch.

Here, the sensing resistor may be implemented as a transformer element transforming an AC voltage. The control method according to one embodiment of the disclosure may further include: controlling the transformer element such that a sum of a voltage transformed by the transformer element and a voltage applied to the fourth switch is smaller than a voltage applied to the second switch, while the input voltage is applied to the first inductor; and controlling the transformer element such that a sum of a voltage transformed by the transformer element and a voltage applied to the third switch is smaller than a voltage applied to the first switch, while the input voltage is applied to the second inductor.

In addition, the first switch and the second switch may have a relatively larger forward voltage drop than the third switch and the fourth switch, or the third switch and the fourth switch may have a relatively smaller turn-on resistance value than the first switch and the second switch.

In addition, the PFC circuit may further include a diode bridge, and the control method may further include charging the output capacitor through the diode bridge in an initial transient state.

Meanwhile, the various embodiments may, of course, be applied to not only the above-described electronic apparatus but also all types of electronic apparatuses each having a display.

Meanwhile, the above-described various embodiments may be implemented in a recording medium that can be read by a computer or an apparatus similar thereto by using software, hardware or a combination thereof. In some cases, the embodiments described in the specification may be implemented as a processor itself. According to implementation by software, the embodiments including the procedures and functions described in the specification may be implemented as separate software modules. Each of the software modules may perform one or more of the functions and operations described in the specification.

Meanwhile, computer instructions for performing processing operations of the electronic apparatus 100 according to the above-described various embodiments may be stored in a non-transitory computer-readable medium. When executed by a processor of a specific device, the computer instructions stored in the non-transitory computer-readable medium cause the specific device to perform the processing operations in the electronic apparatus 100 according to the above-described various embodiments.

The non-transitory computer-readable medium refers to a medium that stores data semi-permanently and is readable by a device, rather than a medium that stores data for a short moment such as a register, a cache, or a memory. Specific examples of the non-transitory computer-readable medium may include a CD, a DVD, a hard disc, a blue-ray disc, a USB, a memory card, and a ROM.

Although the preferred embodiments have been illustrated and described above, the disclosure is not limited to the specific embodiments as described above, and various modification may be made by those skilled in the art without departing from the gist of the disclosure as claimed in the appended claims. Such modifications should not be individually understood from the technical spirit or prospect of the disclosure.

What is claimed is:

1. An electronic apparatus comprising:
    a power factor correction (PFC) circuit; and
    a control circuit configured to control an operation of the PFC circuit,
    wherein the PFC circuit comprises:
        a first inductor part comprising a first inductor connected to one end of an AC voltage part and a first switch connected to the first inductor in series;
        a second inductor part comprising a second inductor connected to another end of the AC voltage part and a second switch connected to the second inductor in series;
        an output part comprising an output capacitor and a sensing resistor, the output part being connected to the first inductor part and the second inductor part, and the output capacitor and the sensing resistor being connected to each other in series; and
        a switching part comprising a third switch connected to the one end of the AC voltage part and a fourth switch connected to the other end of the AC voltage part,
    wherein the control circuit identically applies a switch on/off signal to the first switch and the second switch, and selectively applies a switch on/off signal to the third switch or the fourth switch based on a magnitude of an input voltage input through the AC voltage part.

2. The electronic apparatus as claimed in claim 1, wherein the first inductor part further comprises a first diode having one end connected to the first inductor and another end connected to one end of the output capacitor,
    one end of the first inductor is connected to the one end of the AC voltage part, and another end of the first inductor is connected to one end of the first switch and the one end of the first diode,
    the one end of the first switch is connected to the another end of the first inductor, and another end of the first switch is connected between another end of the output capacitor and one end of the sensing resistor,
    the second inductor part further comprises a second diode having one end connected to the second inductor and another end connected to the one end of the output capacitor,
    one end of the second inductor is connected to the another end of the AC voltage part, and the other end of the second inductor is connected to one end of the second switch and the one end of the second diode, and
    the one end of the second switch is connected to the another end of the second inductor, and another end of the second switch is connected between the another end of the output capacitor and the one end of the sensing resistor.

3. The electronic apparatus as claimed in claim 2, wherein one end of the third switch is connected to the one end of the AC voltage part, and another end of the third switch is connected to another end of the sensing resistor, and
    one end of the fourth switch is connected to the another end of the AC voltage part, and another end of the fourth switch is connected to the another end of the sensing resistor.

4. The electronic apparatus as claimed in claim 2, wherein the one end of the AC voltage part is a positive (+) terminal and the another end of the AC voltage part is a negative (−) terminal,
    when the input voltage is a positive (+) voltage, the control circuit turns off the third switch and turns on the fourth switch to apply the input voltage to the first inductor, and
    when the input voltage is a negative (−) voltage, the control circuit turns on the third switch and turns off the fourth switch to apply the input voltage to the second inductor.

5. The electronic apparatus as claimed in claim 4, wherein the control circuit turns on the first switch while turning on the fourth switch to control the PFC circuit such that a current passing through the first inductor passes through the first switch, the sensing resistor, and the fourth switch, and
    the control circuit turns off the first switch while turning on the fourth switch to control the PFC circuit such that the current passing through the first inductor passes through the first diode, the output capacitor, the sensing resistor, and the fourth switch.

6. The electronic apparatus as claimed in claim 4, wherein the control circuit turns on the second switch while turning on the third switch to control the PFC circuit such that a current passing through the second inductor passes through the second switch, the sensing resistor, and the third switch, and
    the control circuit turns off the second switch while turning on the third switch to control the PFC circuit such that the current passing through the second inductor passes through the second diode, the output capacitor, the sensing resistor, and the third switch.

7. The electronic apparatus as claimed in claim 1, wherein when the input voltage is a positive (+) voltage, the control circuit turns off the third switch and turns on the fourth switch to apply the input voltage to the first inductor,
- when the input voltage is a negative (−) voltage, the control circuit turns on the third switch and turns off the fourth switch to apply the input voltage to the second inductor,
- while the input voltage is applied to the first inductor, a sum of a voltage applied to the sensing resistor and a voltage applied to the fourth switch is smaller than a voltage applied to the second switch, and
- while the input voltage is applied to the second inductor, a sum of a voltage applied to the sensing resistor and a voltage applied to the third switch is smaller than a voltage applied to the first switch.

8. The electronic apparatus as claimed in claim 7, wherein the sensing resistor is implemented as a transformer element configured to transform an AC voltage,
- while the input voltage is applied to the first inductor, the control circuit controls the transformer element such that a sum of a voltage transformed by the transformer element and a voltage applied to the fourth switch is smaller than a voltage applied to the second switch, and
- while the input voltage is applied to the second inductor, the control circuit controls the transformer element such that a sum of a voltage transformed by the transformer element and a voltage applied to the third switch is smaller than a voltage applied to the first switch.

9. The electronic apparatus as claimed in claim 1, wherein the first switch and the second switch have a relatively larger forward voltage drop than the third switch and the fourth switch, or
- the third switch and the fourth switch have a relatively smaller turn-on resistance value than the first switch and the second switch.

10. The electronic apparatus as claimed in claim 1, wherein the PFC circuit further comprises a diode bridge, and
- the control circuit charges the output capacitor through the diode bridge in an initial transient state.

11. A control method of an electronic apparatus including a power factor correction (PFC) circuit and a control circuit configured to control an operation of the PFC circuit, the control method comprising:
- identically applying a switch on/off signal to a first switch and a second switch; and
- selectively applying a switch on/off signal to either a third switch or a fourth switch based on a magnitude of an input voltage input through an AC voltage part,
- wherein the PFC circuit includes:
  - a first inductor part including a first inductor connected to one end of the AC voltage part and the first switch connected to the first inductor in series;
  - a second inductor part including a second inductor connected to another end of the AC voltage part and the second switch connected to the second inductor in series;
  - an output part including an output capacitor and a sensing resistor, the output part being connected to the first inductor part and the second inductor part, and the output capacitor and the sensing resistor being connected to each other in series; and
  - a switching part including the third switch connected to the one end of the AC voltage part and the fourth switch connected to the another end of the AC voltage part.

12. The control method as claimed in claim 11, wherein the first inductor part further includes a first diode having one end connected to the first inductor and another end connected to one end of the output capacitor,
- one end of the first inductor is connected to the one end of the AC voltage part, and another end of the first inductor is connected to one end of the first switch and the one end of the first diode,
- the one end of the first switch is connected to the another end of the first inductor, and another end of the first switch is connected between another end of the output capacitor and one end of the sensing resistor,
- the second inductor part further includes a second diode having one end connected to the second inductor and another end connected to the one end of the output capacitor,
- one end of the second inductor is connected to the another end of the AC voltage part, and another end of the second inductor is connected to one end of the second switch and the one end of the second diode, and
- the one end of the second switch is connected to another end of the second inductor, and another end of the second switch is connected between the another end of the output capacitor and the one end of the sensing resistor.

13. The control method as claimed in claim 12, wherein one end of the third switch is connected to the one end of the AC voltage part, and another end of the third switch is connected to another end of the sensing resistor, and
- one end of the fourth switch is connected to the another end of the AC voltage part, and another end of the fourth switch is connected to the another end of the sensing resistor.

14. The control method as claimed in claim 12, wherein the one end of the AC voltage part is a positive (+) terminal and the another end of the AC voltage part is a negative (−) terminal, and
- the selectively applying of the switch on/off signal to the third switch or the fourth switch includes:
- turning off the third switch and turning on the fourth switch to apply the input voltage to the first inductor, when the input voltage is a positive (+) voltage; and
- turning on the third switch and turning off the fourth switch to apply the input voltage to the second inductor, when the input voltage is a negative (−) voltage.

15. The control method as claimed in claim 14, wherein the turning-on of the fourth switch includes:
- controlling the PFC circuit such that a current passing through the first inductor passes through the first switch, the sensing resistor, and the fourth switch, in a state where the first switch is turned on; and
- controlling the PFC circuit such that the current passing through the first inductor passes through the first diode, the output capacitor, the sensing resistor, and the fourth switch, in a state where the first switch is turned off.

16. A control method for controlling an operation of an electronic apparatus including a power factor correction circuit, the control method comprising:
- applying identical signals to switch on or switch off a first switch and a second switch; and
- based on a magnitude of an input voltage input through an AC voltage part, selectively applying a signal to switch off a third switch and a signal to switch on a fourth switch or selectively applying a signal to switch on the third switch and a signal to switch off the fourth switch;

wherein the power factor correction circuit includes:
- a first inductor part including a first inductor connected to one end of the AC voltage part and the first switch connected to the first inductor in series;
- a second inductor part including a second inductor connected to another end of the AC voltage part and the second switch connected to the second inductor in series;
- an output part including an output capacitor and a sensing resistor, the output part being connected to the first inductor part and the second inductor part, and the output capacitor and the sensing resistor being connected to each other in series; and
- a switching part including the third switch connected to the one end of the AC voltage part and the fourth switch connected to the another end of the AC voltage part.

17. The control method of claim 16, wherein based on an input voltage being a positive voltage, applying the signal to switch off the third signal and the signal to switch on the fourth switch; and based on the input voltage being a negative voltage, applying the signal to switch on the third signal and the signal to switch off the fourth switch.

18. The control method of claim 17, wherein based on the fourth switch being turned on, applying a signal to turn on the first switch, to pass a current that passes through the first inductor pass through the first switch, the sensing resistor, and the fourth switch; and applying a signal to turn off the first switch, to pass the current that passes through the first inductor pass through a first diode, the sensing resistor, and the fourth switch.

19. The control method of claim 17, wherein based on the third switch being turned on, applying a signal to turn on the second switch, to pass a current that passes through the second inductor pass through the second switch, the sensing resistor, and the third switch; and applying a signal to turn off the second switch, to pass the current that passes through the second inductor pass through a second diode, the sensing resistor, and the third switch.

* * * * *